US009989630B2

(12) United States Patent
Gruenwald

(10) Patent No.: US 9,989,630 B2
(45) Date of Patent: Jun. 5, 2018

(54) STRUCTURED-LIGHT BASED MULTIPATH CANCELLATION IN TOF IMAGING

(71) Applicant: Infineon Technologies AG, Neubiberg (DE)

(72) Inventor: Johannes Gruenwald, Graz (AT)

(73) Assignee: Infineon Technologies AG, Neubiberg (DE)

( * ) Notice: Subject to any disclaimer, the term of this patent is extended or adjusted under 35 U.S.C. 154(b) by 295 days.

(21) Appl. No.: 14/710,725

(22) Filed: May 13, 2015

(65) Prior Publication Data

US 2016/0334509 A1    Nov. 17, 2016

(51) Int. Cl.
| G01S 7/497 | (2006.01) |
| G01S 7/487 | (2006.01) |
| G06K 7/10 | (2006.01) |
| H04B 5/02 | (2006.01) |
| H04Q 5/22 | (2006.01) |
| H04B 7/06 | (2006.01) |
| G01S 17/89 | (2006.01) |
| G01S 7/491 | (2006.01) |
| G01S 17/93 | (2006.01) |

(52) U.S. Cl.
CPC ............ *G01S 7/4876* (2013.01); *G01S 7/497* (2013.01); *G01S 7/4911* (2013.01); *G01S 17/89* (2013.01); *G06K 7/10089* (2013.01); *H04B 5/02* (2013.01); *H04B 7/0617* (2013.01); *H04Q 5/22* (2013.01); *G01S 17/936* (2013.01)

(58) Field of Classification Search
CPC ......... H04B 5/02; G06K 7/10089; H04Q 5/22
See application file for complete search history.

(56) References Cited

U.S. PATENT DOCUMENTS

| 2008/0181461 | A1* | 7/2008 | Saito ................... G06K 9/00825 382/104 |
| 2009/0005679 | A1* | 1/2009 | Dala-Krishna ...... A61B 8/0883 600/437 |
| 2010/0308977 | A1* | 12/2010 | Ninomiya ................ H04B 5/02 340/10.5 |
| 2012/0154537 | A1* | 6/2012 | Chang ................... H04N 5/2256 348/46 |
| 2012/0206575 | A1* | 8/2012 | Massanell ............. G01S 7/4972 348/46 |
| 2012/0236121 | A1* | 9/2012 | Park ................... H04N 13/0253 348/46 |
| 2013/0148102 | A1 | 6/2013 | Oggier |
| 2013/0211672 | A1* | 8/2013 | Roehder ................. G06F 17/00 701/36 |

FOREIGN PATENT DOCUMENTS

| JP | 2001124848 A | * 5/2001 |
| JP | 2002036989 A | * 2/2002 |

* cited by examiner

*Primary Examiner* — Charlie Y Peng
(74) *Attorney, Agent, or Firm* — Harrity & Harrity, LLP

(57) ABSTRACT

Representative implementations of devices and techniques provide multipath interference cancelling for imaging devices and systems. In various implementations, structured light is used to diminish, if not cancel interference. For example, the light may be structured with respect to amplitude or phase, based on an emission angle of the light.

26 Claims, 11 Drawing Sheets

STRUCTURED-LIGHT BASED MULTIPATH CANCELLATION IN TOF IMAGING

BACKGROUND

Imaging systems based on light waves are becoming more widely used for object detection as semiconductor processes have become faster to support such systems. Some imaging systems are capable of providing dozens of images per second, making such systems useful for object detection and/or tracking as well. Due to their potentially small form factor and potentially high signal fidelity, some imaging systems are well suited for application in many types of vehicles (cars, busses, trains, etc.). Additionally, some imaging systems are well suited for gesture control, or the like, in many types of consumer devices (e.g., television, computers, tablets, smartphones, etc.). While the resolution of such imaging systems may vary, applications using these systems are able to take advantage of the speed of their operation.

A moving vehicle such as an automobile, for example, may use an imaging system to detect an object (a pedestrian, for example) in the path of the vehicle, to avoid hitting the object. For example, an imaging system may be employed on the front, rear, and/or the side(s) of the vehicle to detect objects in the forward or reverse paths of the vehicle, to the side of the vehicle, or in the blind spots of the vehicle.

Time-of-flight (ToF) cameras, for example, may use imaging devices to measure the distance of an object from the camera. Imaging devices using multiple pixels may also be used, where light signals associated with individual pixels may provide distance measurements for discrete points on the object, forming a three-dimensional "distance image." This can be made possible with light signals reflected off of the discrete points, for example.

Whether deployed in a vehicle application, a consumer device application, or other type of application, it is desirable to increase the accuracy of the imaging systems and to minimize error. For example, the usefulness of an imaging system as applied to a vehicle, mobile device, or the like, can be diminished when the accuracy of the distance measurements is error-prone or otherwise unreliable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

FIG. 8 illustrates an example of phase-structured light, according to an implementation.

DETAILED DESCRIPTION

Overview

Figure 1:
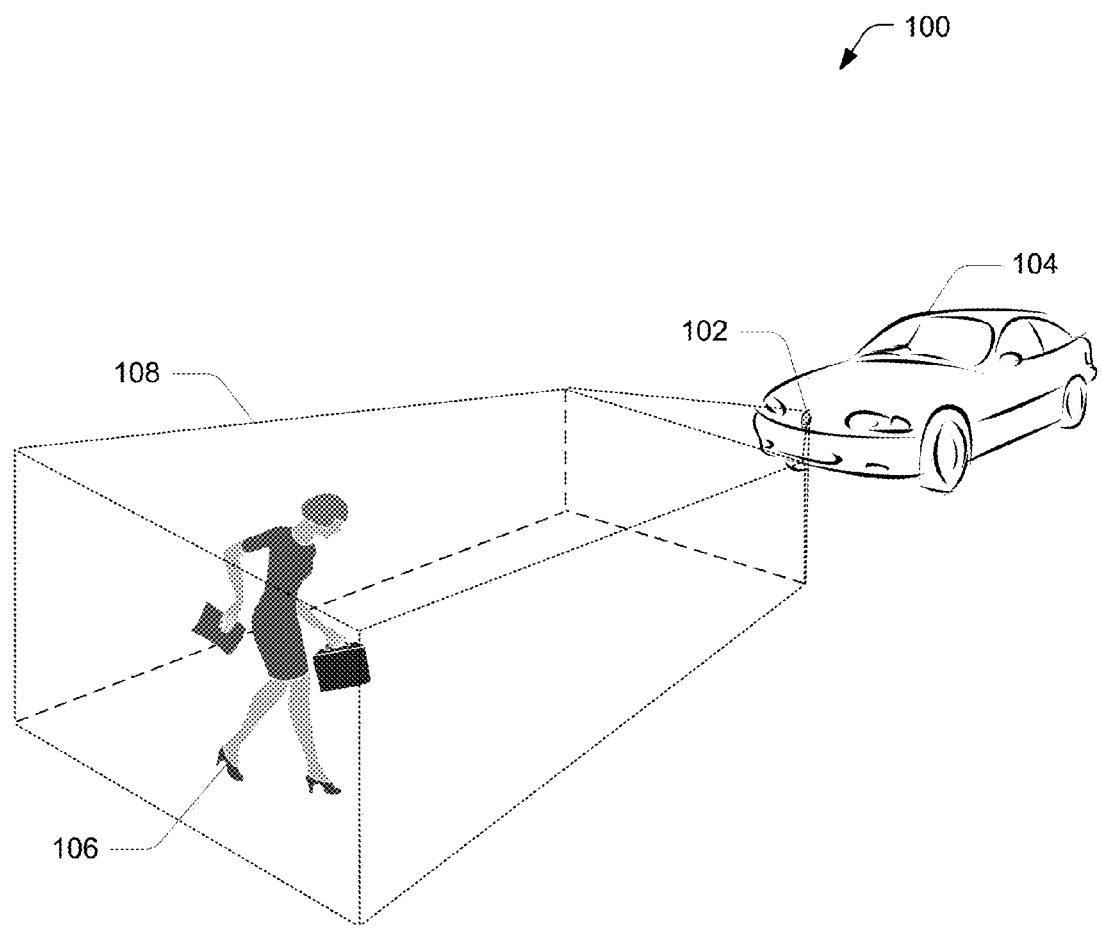
FIG. 1 is an illustration of an example application environment in which the described devices and techniques may be employed, according to an implementation.

This disclosure is related to imaging systems (imaging systems using emitted electromagnetic (EM) radiation, for example) that are arranged to detect, image, recognize, and/or track objects and/or gestures in a predetermined area relative to the imaging systems. For example, an imaging system associated with a vehicle may be used to detect an object in the path of the vehicle, or in an area near the vehicle. Additionally, the imaging system may track the object or provide an image (such as a three-dimensional image, for example) of the object. In other examples, an imaging system may be used to detect and recognize gestures of an object or a human hand, for instance, in an area near a computing device. The imaging system may recognize when the object or hand is making a gesture, and track the hand-gesture combination as a replacement for a mouse or other input to the computing device.

In various implementations, the imaging system uses time-of-flight principles, such as distance calculations of reflected EM emissions (i.e., electro-magnetic radiation), to detect, image, recognize, and/or track objects, for example. Time-of-flight distance calculations may be based on receiving reflections of emitted EM ("light") radiation, as the light radiation is reflected off objects in a predetermined area. For example, in one case, the distance calculations may be based on the speed of light and the travel time of the reflected light radiation.

However, when the emitted light is diffuse, multiple reflections from objects in the illuminated scene may be received by the imaging system. In many cases, this multipath interference can result in erroneous distance measurements. Representative implementations of devices and techniques provide multipath interference cancelling for imaging devices and systems. In various implementations, structured light is used to diminish, if not cancel interference. For example, the light may be structured with respect to amplitude or phase, based on an emission angle of the light.

Some structured light solutions may include capturing two frames or images according to the following technique: One captured frame includes full illumination (high lateral resolution, which is generally impaired by multipath interference (MPI)). The other captured frame includes a sparse illumination grid (low lateral resolution, and generally diminished MPI). The second frame can then be used to attempt to correct erroneous depth information in the first frame. However, in various implementations, a number of drawbacks to this technique are overcome or are not present when using the herein disclosed devices and techniques.

For example, 1) unlike some techniques, the position of the sparsely illuminated pixels in the second captured frame need not be determined when using the disclosed devices and techniques. 2) Correction values are determined over all of the pixel array when using the disclosed devices and techniques, instead of only determined for the mentioned sparsely distributed pixels. 3) Unlike some techniques, there is no need for interpolation of correction values for all other pixels, since all correction values are real values when using the disclosed devices and techniques. 4) Reconstruction involves basic arithmetic when using the disclosed devices and techniques, rather than sophisticated image processing algorithms (segmentation/classification, 2D-interpolation, etc.). 5) For some techniques, the two captured frames are not separable, thus depth information can only be updated every other frame. Contrarily, updated information can be received with each single frame (depending on the previous frame) when using the disclosed devices and techniques.

Various implementations and arrangements for imaging systems, devices, and techniques are discussed in this disclosure. Techniques and devices are discussed with reference to example light-based imaging systems and devices illustrated in the figures. However, this is not intended to be limiting, and is for ease of discussion and illustrative convenience. The techniques and devices discussed may be applied to any of various imaging device designs, structures, and the like (e.g., radiation based, sonic emission based, particle emission based, etc.) and remain within the scope of the disclosure.

Implementations are explained in more detail below using a plurality of examples. Although various implementations and examples are discussed here and below, further implementations and examples may be possible by combining the features and elements of individual implementations and examples.

Example Imaging System Environment

FIG. 1 is an illustration of an example application environment 100 in which the described devices and techniques may be employed, according to an implementation. As shown in the illustration, an imaging system 102 may be applied with a vehicle 104 (e.g., automobile, bus, train, aircraft, etc.), for example. In various other implementations, the imaging system 102 may be applied with other systems, devices, and the like (e.g., robotics, automation, surveillance systems, accessibility devices, safety systems, and so forth).

In further implementations, the imaging system 102 may be applied with mobile devices or other computing devices such as laptop or notebook computers, hand-held computing devices, tablet computing devices, netbook computing devices, personal digital assistant (PDA) devices, reader devices, smartphones, mobile telephones, media players, wearable computing devices, stationary computers, personal or desktop computers, televisions, set-top boxes, gaming consoles, audio/video systems, appliances, and the like.

The scope of the disclosure is not intended to be limited to the examples listed. For convenience, reference within this disclosure to a vehicle 104 also refers to all applications employing an imaging system 102 as mentioned above, and otherwise.

In various implementations, the imaging system 102 may be integrated with the vehicle 104, or may have some components separate or remote from the vehicle 104. For example, some processing for the imaging system 102 may be located remotely (e.g., cloud, network, etc.). In another example, some outputs from the imaging system may be transmitted, displayed, or presented on a remote device or at a remote location.

The imaging system 102 may be used to detect an object 106, such as a pedestrian, for example, in a preselected area 108. In various implementations, the imaging system 102 may be arranged to detect, recognize, and/or track the movement of the object 106. In one implementation, the imaging device is arranged to output an image (e.g., a two-dimensional or three-dimensional image) of the object 106. In an example implementation, an output of the imaging system 102 may be presented or displayed on a display device, for example (e.g., a mobile computing device, a smartphone, a vehicle information system, etc.).

An example object 106 may include any item that an imaging system 102 may be arranged to detect, recognize, track, and/or the like. Such items may include a person or an animal, for example. Other examples of an object 106 may include an obstruction, a target component, another vehicle, and so forth. In various implementations, the imaging system 102 may also be arranged to detect, recognize, and/or track a gesture or configuration of the object 106. A gesture or configuration may include any movement or position of the object 106 that is expressive of an idea. For example, a gesture or configuration may include positioning an object 106 in an orientation and/or a movement of the object 106 in a pattern (e.g., in an elliptical motion, in a substantially linear motion, etc.). In one example, the imaging system 102 may be used to detect movement (e.g., a gesture) of a human hand, for example, as a replacement for a mouse or other input device for a computing device, mobile device, or the like.

The imaging system 102 may be arranged to detect, recognize, and/or track an object 106 that is within a preselected area 108 relative to the imaging system 102. A preselected area 108 may be chosen to encompass an area that objects 106 may be within, for example. In one case, the preselected area 108 may encompass an area that represents an immediate or distant forward or reverse path for the vehicle 104. This area 108 may also be to the front, side, or around the imaging system 102, for example.

The illustration of FIG. 1 shows a preselected area 108 as a polygonal-like area in front of the vehicle 104. This is for illustration and discussion purposes, and is not intended to be limiting. A preselected area 108 may be any shape or size, may be located in front, back, side(s), top, and/or bottom of the vehicle 104, and may be chosen such that it will generally encompass desired objects when they are present, but may not encompass undesired objects (e.g., other items that are not intended to be detected, recognized, tracked, or the like). In various implementations, the preselected area 108 may comprise various shapes and sizes. In some implementations, the shape and size of the preselected area 108 is dependent on the current application of the imaging device 102.

As discussed above, the techniques, components, and devices described herein with respect to an imaging system 102 are not limited to the illustration in FIG. 1, and may be applied to other imaging system and device designs and/or applications without departing from the scope of the disclosure. In some cases, additional or alternative components may be used to implement the techniques described herein. It is to be understood that an imaging system 102 may be implemented as stand-alone system or device, or as part of another system (e.g., integrated with other components, systems, etc.).

Example Imaging System

Figure 2:
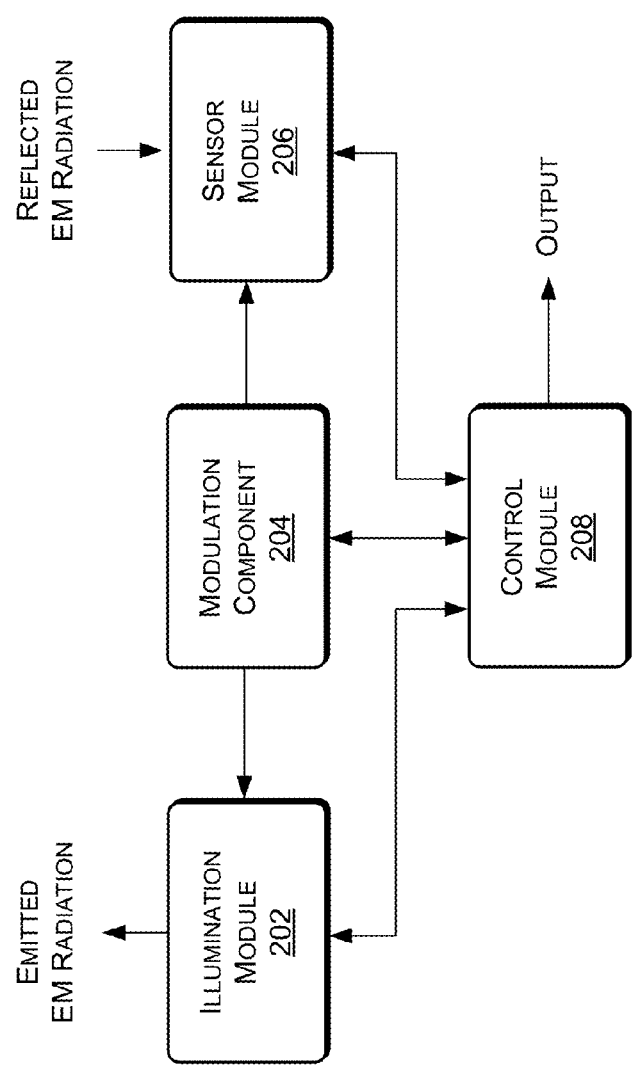
FIG. 2 is a block diagram of example imaging system components, according to an implementation.

FIG. 2 is a block diagram showing example components of an imaging system 102, according to an implementation. As shown in FIG. 2, an imaging system 102 may include an illumination module 202, a modulation component 204, a sensor module 206, and a control module 208. In various implementations, an imaging system 102 may include fewer, additional, or alternate components, and remain within the scope of the disclosure. One or more components of an imaging system 102 may be collocated, combined, or otherwise integrated with another component of the imaging system 102. For example, in one implementation, the imaging system 102 may comprise an imaging device or apparatus. Further, one or more components of the imaging system 102 may be remotely located from the other(s) of the components.

In an implementation, the illumination module 202 is arranged to emit electromagnetic (EM) radiation (e.g., light radiation) to illuminate the preselected area 108. For example, the illumination module 202 may be arranged to illuminate one or more objects 106 that may be present in the area 108, to detect the objects, or to detect movement of the objects 106. In various implementations, the illumination module 202 includes an illumination source such as a light emitter, for example. In one implementation, the illumination source comprises a light-emitting diode (LED). In another implementation, the illumination source comprises a laser emitter. In one implementation, the illumination module 202 illuminates the entire environment (e.g., the preselected area 108) with each light pulse emitted. In an alternate implementation, the illumination module 202 illuminates the environment in stages or scans.

In various implementations, different forms of EM radiation may be emitted from the illumination module 202. In some implementations, infrared light, or the like, is emitted. For example, the light radiation may comprise one or more modulated light pulses. The illumination module 202 may be switched on for a short interval, allowing the emitted light pulse(s) to illuminate the area 108, including any objects 106 within the area 108. Infrared light, for example, provides illumination to the area 108 that is not visible to the human eye, and so is not distracting. In other implementations, other types or frequencies of EM radiation may be emitted that provide visual feedback or the like. As mentioned above, in alternate implementations, other energy forms (e.g., radiation based, sonic emission based, particle emission based, etc.) may be emitted by the illumination module 202.

In an implementation, the illumination module 202 emits spatially structured light rays. For example, the spatial structure of the light rays is dependent on the emission angles of the light rays of the emitted light radiation. In various implementations, the structure of the emitted light may be controlled by a control component, such as the control module 208, for example. In such implementations, the control component controls the amplitudes and/or the phase offsets of the light rays of the spatially structured light radiation emitted by the illumination module 202. For example, the control component controls the magnitude of the amplitudes and/or the amount of the phase offsets of the light rays, based on the emission angles of the light rays of the spatially structured light radiation.

If included in an implementation, the modulation component 204 may be arranged to modulate the EM radiation emitted from the illumination module 202 and/or to modulate one or more components (e.g., photosensitive pixels 302) of the sensor module 206. In various implementations, the modulation component 204 may be arranged to correlate the modulation of the EM radiation with the modulation of the components of the sensor module 206 during time-of-flight operation (e.g., to calculate a distance of an object 106 from the imaging system 102 and/or to form a two-dimensional or three-dimensional image of the object 106, for example).

Figure 3:
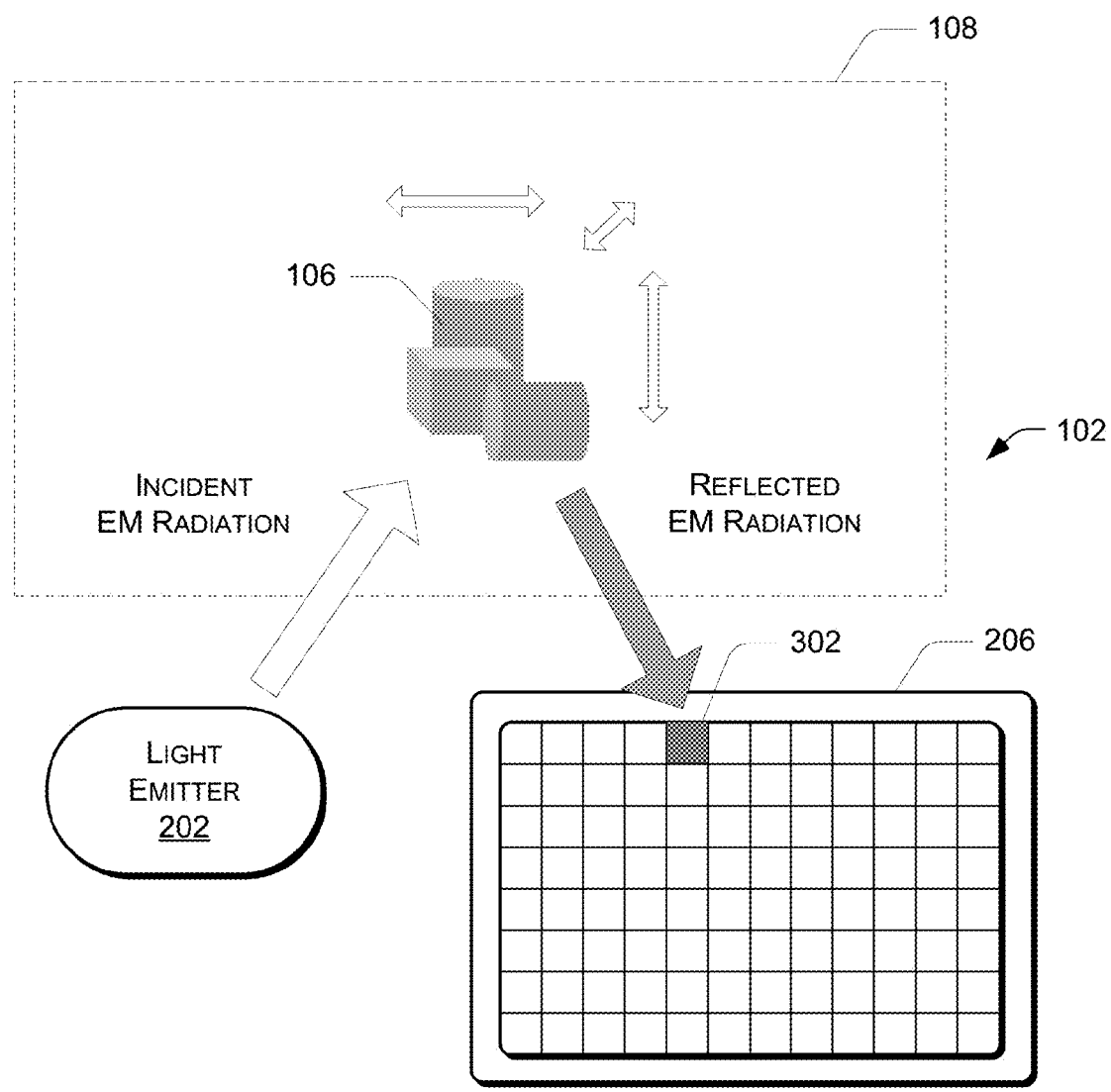
FIG. 3 is a block diagram showing some detail of components of an example imaging system, including a sensor module comprising a plurality of pixels, according to an implementation.

In various implementations, as shown in FIGS. 2 and 3, a sensor module 206 is included in an imaging system 102. In an implementation, the sensor module 206 comprises an imaging sensor arranged to receive (e.g., capture) reflected light radiation from one or more objects 106 in the area 108 during a frame event (i.e., during an image capture at a point in time). In one example, the sensor module 206 may be arranged to capture an image (e.g., two-dimensional image or three-dimensional image) of the area 108 or of the object 106 within the area 108 based on receiving the reflection of the light radiation. The sensor module 206 may be arranged to capture the image using time-of-flight principles, for instance.

In another example, the sensor module 206 is arranged to provide phase shift information between the incident light radiation and the reflected light radiation for distance measurement calculations. For instance, in an implementation, the sensor module 206 is arranged to capture one or more phase delay values of the light radiation reflected off one or more objects 106 in the area 108 during a frame event. The phase delay values represent a phase shift in the reflected light radiation from the incident light radiation, based on a distance travelled.

In an implementation, as shown in FIG. 3, the sensor module 206 is comprised of a plurality of photosensitive pixel devices ("pixels") 302. In one example, each of the multiple pixels 302 may act as an individual image sensor. In such an example, a resulting multi-dimensional image (such as a three-dimensional "distance image," for example) from the sensor module 206 is a combination of the light radiation received at multiple individual pixels 302.

In an implementation, each of the plurality of photosensitive pixels 302 are arranged to capture light radiation reflected off one or more objects 106 in the area 108. In various implementations, the light radiation captured by individual pixels 302 during a frame event may be processed within the control module 208, for instance, to determine individual distances from the object(s) 106 in the area 108 to the individual pixels 302. The distances associated with the individual pixels 302 may be combined to form the three-dimensional distance image of the object(s) 106 and/or of the area 108.

In various examples, however, the captured reflected light may be subject to multipath interference. For example, the captured light may include erroneous depth values (i.e., distance information) based on the presence of the multipath interference in the captured light radiation.

When included in an implementation, the control module 208 may be arranged to provide controls and/or processing to the imaging system 102. For example, the control module 208 may control the operation of the imaging system 102, control the operation of one or more of the other modules (202, 204, 206), and/or process the signals and information output by one or more of the other modules (202, 204, 206). In various implementations, the control module 208 is arranged to communicate with one or more of the illumination module 202, modulation component 204, and sensor module 206. In some implementations, the control module 208 may be integrated into one or more of the other modules (202, 204, 206), or be remote to the modules (202, 204, 206).

In an implementation, the control module 208 is arranged to control a structure of the light radiation emitted from a light source (the illumination module 202, for example) of the imaging system 102, according to emission angles of light rays of the light radiation. For example, in one implementation, the control module 208 applies a spatially structured amplitude pattern to the light rays of the light radiation. In the implementation, an amplitude of a light ray is determined according to an emission angle of the respective light ray.

In another implementation, the control module 208 applies a structured phase offset to the light rays of the light radiation, where a phase offset of a light ray is determined by an emission angle of the respective light ray. In the implementation, the control module 208 can determine the corrected depth values based on cancellation of multipath interference from destructive interference due to the phase offset of the light rays. Also in the implementation, the control module 208 provides compensation for depth values corresponding to light radiation captured by the imaging sensor 202 due to the phase shift. For example, the compensation includes a correction for the distance offset due to the phase offset applied to the light rays. In an alternate implementation, the control module 208 structures the amplitudes and the phase offsets of the light rays of the spatially structured light radiation emitted by the illumination module 202, based on the emission angles of the respective light rays.

In a further implementation, the control module 208 controls the structure of the spatially structured light emissions based on one or more weight and/or offset patterns, where a weight and/or an offset of the one or more weight and/or offset patterns is dependent on the emission angles of the rays of the light radiation.

In an implementation, the control module 208 is arranged to determine corrected depth values from the captured reflected light radiation, using the emission-angle based structure of the light radiation. In various examples, the control module 208 is arranged to diminish or cancel one or more components of multipath interference of the light radiation captured during the one or more frame events, based on application of a spatially structured light radiation pattern and/or a spatially structured phase offset to the light rays of the light radiation emitted by the illumination module 202.

In another implementation, the control module 208 reconstructs distance information from the captured light radiation based on combining first information from a first frame event corresponding to a first spatially structured light pattern and second information from a second frame event corresponding to a second spatially structured light pattern. In the implementation, the first spatially structured light pattern is different from the second spatially structured light pattern. For example, in one case, the second spatially structured light pattern is based on an inversion of the first spatially structured light pattern.

In one implementation, the control module 208 is arranged to separate the captured light radiation into amplitude and/or phase components of the fundamental wave of a sensor response function (SRF) output by a pixel 302 of the imaging sensor 202.

In various implementations, the control module 208 is arranged to calculate a distance from the one or more objects 106 to the sensor module 206, based on corrected depth values determined from the structured light radiation captured by the sensor module 206 (e.g., the pixels 302) during one or more frame events. In an implementation, a control module 208 may include at least one or more processing components ("processor") and one or more memory storage devices. In various implementations, the processor may comprise a computing device, a controller, logic components, or the like.

In one implementation, the control module 208 is arranged to output the calculated distance and/or the three-dimensional image of the object 106. For example, the imaging system 102 may be arranged to output a distance, a three-dimensional image of the detected object 106, tracking coordinates of the object 106, and so forth, to a display device, to another system arranged to process the information, or the like.

In the various implementations, the imaging system 102 uses Time-of-Flight (ToF) 3D-imaging techniques based on propagation-delay measurements of emitted (and reflected) light beams. For example, the emitted light (from the illumination module 202) may be modulated by the modulation component 204 at a certain frequency $f_{mod}$ (e.g. 20 MHz). At time of return to the sensor module 206, the covered distance can be reconstructed by the control module 208 from its phase shift via the speed of light. The phase shift in turn is estimated by correlating the incident signal with its non-delayed pendant on chip. In some implementations, the outputs of each single imaging pixel 302 are N (e.g. 3, 4, 6, 8, etc.) equidistant samples of a correlation function, referred to as the sensor-response function (SRF), shown in FIG. 4.

Figure 4:
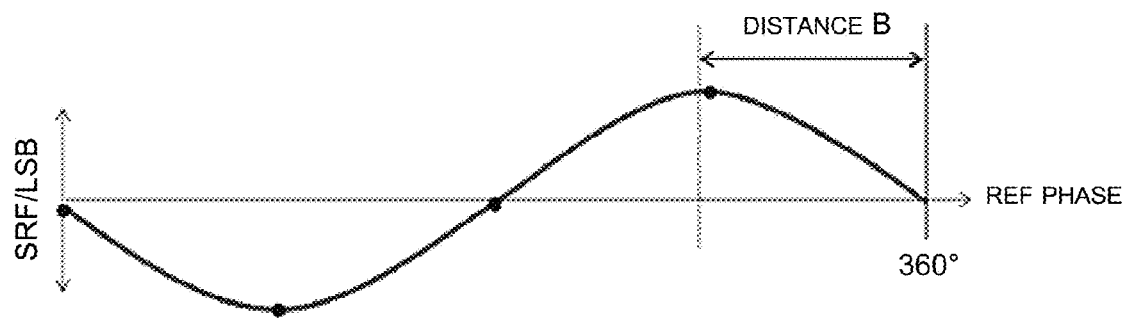
FIG. 4 illustrates an example sensor response function waveform, according to an implementation.

The shape of the SRF can vary between triangular and sinusoidal, depending on the modulation frequency. In some imaging systems 102, distance estimation algorithms compute the phase of the fundamental wave of the SRF and can reconstruct the distance information from this value. FIG. 4 illustrates a typical shape of a SRF waveform and refers to a distance B, which represents the distance measurement of the imaging system 102. The four equidistant dots on the SRF waveform indicate the example discrete samples at the output of the sensor 206.

Figure 5:
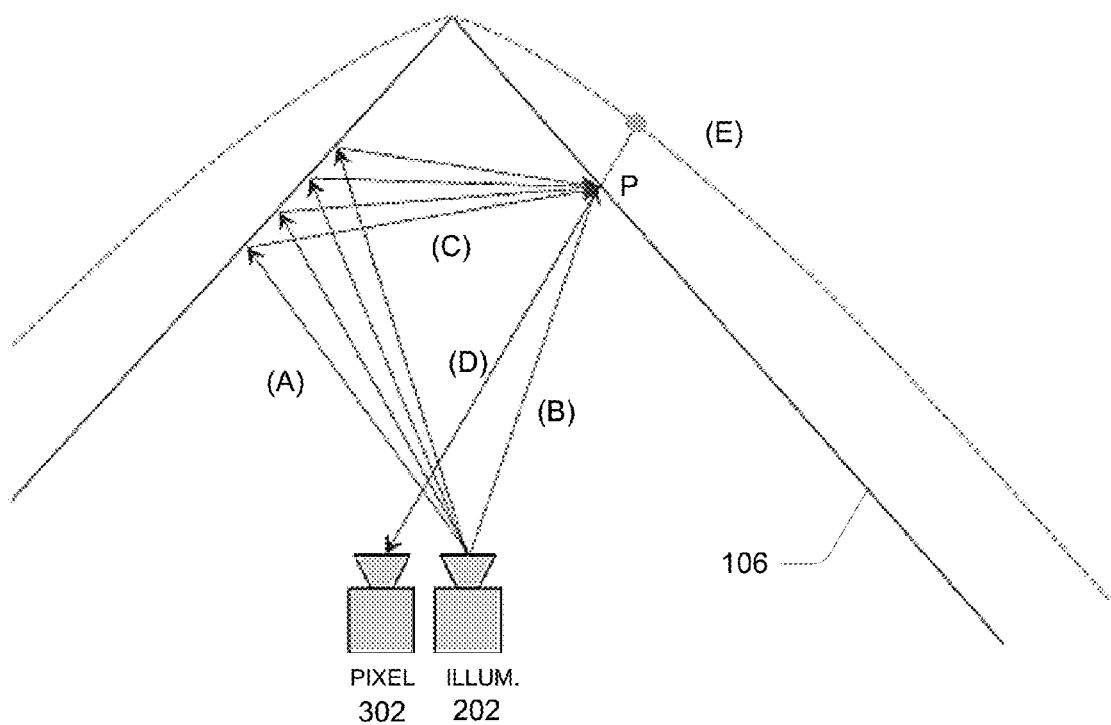
FIG. 5 illustrates an example sensor response function waveform and an example of multipath interference, according to an implementation.

In some cases, however, as shown in FIG. 5, the illumination unit 202 of a ToF imaging system 102 emits diffuse light. Depending on the scene 108 illuminated, several optical paths (i.e., light rays of the emitted light radiation; shown at (A) and (B)) from the illumination unit 202 to the imager pixel 302 of the sensor 206 can be constructed from the diffuse light. One pixel 302 then captures a superposition of all these paths, comprising one signal path (B) (representing the actual distance measurement) and a possible multitude of disturbing paths (C) (which are technically the same light rays as (A)). These multipath components (C) alter the measured distance, resulting in a deviation referred to as multipath interference or multipath error.

For example, FIG. 5 illustrates an example scenario of multipath interference for one exemplary pixel 302. The sensing path is indicated at (B) and the multipath components are indicated at (A) and (C). The summation path sensed by the pixel 302 is shown at (D), which comprises the combination of the sensing path (B) and the multipath components (C), and extends beyond the actual distance of the sensed object 106 (in this case a surface, for example). The resulting, erroneous depth image is shown by the dashed line at (E).

For the sake of clarity, it can be noted that due to optics, the pixel 302 does not sense incident light diffusely, but senses light rays that arrive well aligned to (D). One way to illustrate this, is using the point "P" (which is an intersection of (B), (C), and (D) on the wall) which can be referred to as a "point in focus" of pixel 302, or similar. It can be seen that all light rays incident on pixel 302 must pass this point in focus "P." On the contrary, a direct path (i.e., after the first wall reflection) from one of the rays of (A) to pixel 302 is optically impossible.

Example Implementations

In an implementation, spatially structured light is applied, separating optical paths according to their emission angle, and thus compensating for ToF multipath interference. For example, due to the linearity of the optical channel, the distance information captured by the pixel 302 can be separated into its contributors, isolating the sensing path (i.e., actual distance measurement) from the interfering components of light received.

Figure 6:
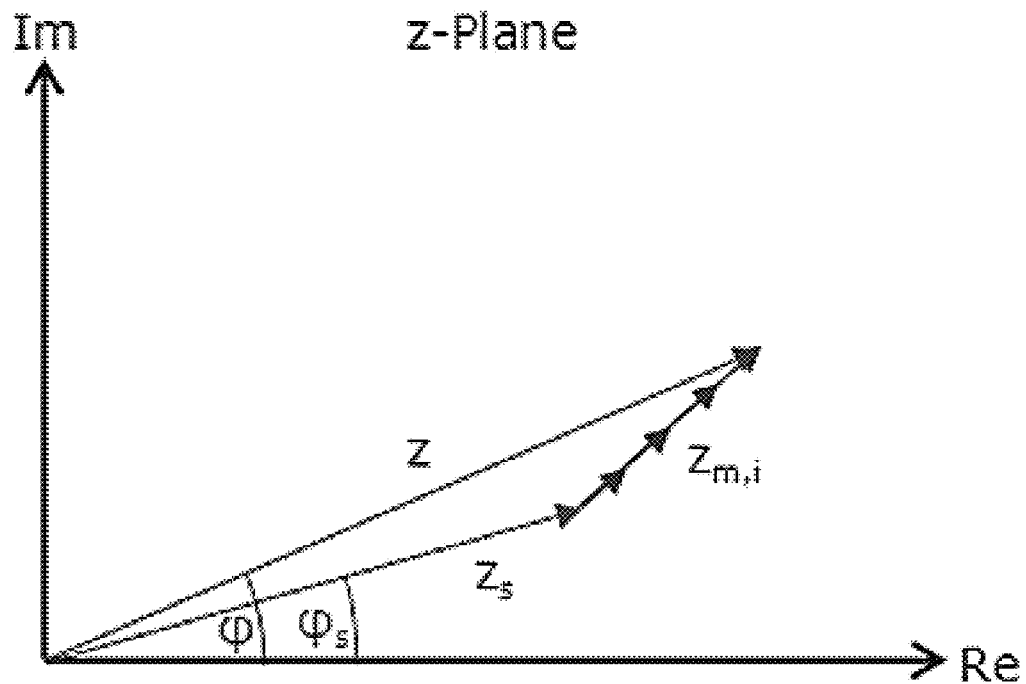
FIG. 6 illustrates an example of a signal phasor and multipath phasors in the complex plane, according to an implementation.

Referring to FIG. 6, the sensing path $z_s$ and the multipath components $z_m$, as well as the summation path Z, can be modelled using the notation of phasors in the complex plane. For instance, the general results of ToF distance estimation, phase and amplitude of the fundamental wave of the SRF, can be seen as a phasor in the complex plane. In the presence of multipath interference (e.g., (A) and (C) from FIG. 5), the observed phasor z is a superposition of the signal phasor $z_s$ and a variety of multipath phasors $z_m$.

As shown in FIG. 6, in a scenario of multipath interference, (1) a multitude of similar multipath phasors $z_m$, exist which refer to (2) light rays with different emission angles from the light source $z_s$. In an implementation, weights are applied to light rays (e.g., including light rays represented by $z_m$ and $z_s$) with respect to their emission angle. In the implementation, the application of weights with respect to the emission angles allows a reconstruction of the true distance. This is further discussed via the following analysis.

Considering a set of weight patterns $w_k(\theta,\varphi)$, $k \in \{0, \ldots, N-1\}$, where $\theta,\varphi$ are horizontal and vertical emission angles, in an implementation towards cancellation of multipath interference, the following predefined properties are fulfilled when applying the weights:

Weights are either zero or one: $w_k(\theta,\varphi) \in [0,1] \forall k,\theta,\varphi$ The weight patterns are complementary: $\Sigma_k w_k(\theta,\varphi) = 1 \forall \theta,\varphi$ The spatial integral of the weight of all patterns is equal: $\iint w_k(\theta,\varphi) d\theta d\varphi = const \ \forall k$ The range over k is as large as possible, i.e. $\max(w_{k1}(\theta,\varphi) - w_{k2}(\theta,\varphi)) \simeq 1 \forall \theta,\varphi$ The spatial frequency and contrast of the patterns is as high as possible. For example, as close as possible to one weight value per imaged pixel (e.g., high-frequency salt and pepper noise).

In an implementation, the control module 208 performs algorithmic cancellation of ToF multipath interference, using the predefined properties above. In various implementations, other algorithms may be used by the control module 208 to cancel multipath interference, based on structuring light according to emission angles. For example, in some implementations, an algorithm may be adapted to match non-idealities of the light sources 202.

In an implementation, an example weight pattern with respect to the aforementioned predefined properties includes a checkerboard pattern, where each weight refers to one imager pixel 302. In one implementation, a weight pattern set comprises two patterns, a non-inverted and an inverted version of the checkerboard pattern. In an example, capturing one image frame with pattern k leads to the following result on a pixel 302 level:

$$z_k(x,y) = w_k(\theta_x,\varphi_y)z_s(\theta_x,\varphi_y) + \iint_{\overline{\varphi}} w_k(\overline{\theta},\overline{\varphi})z_m(\overline{\theta},\overline{\varphi},\theta_x,\varphi_y)d\overline{\theta}d\overline{\varphi}$$

where $\theta_x$ and $\varphi_y$ refer to the emission angle of a light ray that is imaged to a pixel 302 with coordinates (x,y).

The term $z_m(\overline{\theta},\overline{\varphi},\theta_x,\varphi_y)$ refers to a multipath phasor $z_m$ that emits from the light source 202 at angles (194) and is imaged to pixel 302 (x,y). From a statistical perspective, it is evident that the value of the integral will not vary with k as the weight patterns are independent of the scene (108, 106) and the spatial frequency and contrast of the pattern are as high as possible. Consequently, the value of the integral will only depend on $(\theta_x, \varphi_y)$:

$$z_k(x,y) = w_k(\theta_x,\varphi_y)z_s(\theta_x,\varphi_y) + \overline{z}_m(\theta_x,\varphi_y).$$

In an implementation based on this expression, if at least two observations (e.g., image frames) are given, $z_s$ can be easily reconstructed. For example, when N=2, reconstruction is particularly easy:

$$z_0(x,y) = w_0(\theta_x,\varphi_y)z_s(\theta_x,\varphi_y) + \overline{z}_m(\theta_x,\varphi_y)$$

$$z_1(x,y) = w_1(\theta_x,\varphi_y)z_s(\theta_x,\varphi_y) + \overline{z}_m(\theta_x,\varphi_y)$$

Subtracting the smaller from the larger value yields:

$$\Delta z(x,y) = \max(z_0(x,y),z_1(x,y)) - \min(z_0(x,y),z_1(x,y)) \propto z_s$$
$$(\theta_x,\varphi_y) \Rightarrow \arg(\Delta z(x,y)) = \arg(z_s(\theta_x,\varphi_y))$$

This allows, in an example, a perfect reconstruction of the true measurement distance (e.g., represented by the phasor $z_s$). In various implementations, the reconstruction quality depends on the magnitude of $\Delta z$. In many scenarios, there can be spatial transitions in the weight patterns, since it can be difficult to achieve steep gradients (step functions). In this case, a figure of merit for reconstruction quality may be introduced, such as:

$$q(x,y) = \frac{|z_0(x,y) - z_1(x,y)|}{|z_0(x,y) + z_1(x,y)|} \in [0,1].$$

In an implementation, if q(x,y) exceeds a certain threshold, $\Delta z(x,y)$ may be computed, otherwise it may not. In order to apply multipath cancellation over the whole image array, but not just for pixels 302 with high enough reconstruction accuracy, a correction map may be established.

In an implementation, an example correction map includes computing the sum of the N observations, where the result refers to the original image, affected by multipath interference:

$$\hat{z}(x,y) = \sum_k z_k(x,y)$$
$$= \sum_k w_k(\vartheta_x,\varphi_y)z_s(\vartheta_x,\varphi_y) + N\overline{z}_m(\vartheta_x,\varphi_y)$$
$$= z_s(\vartheta_x,\varphi_y) + N\overline{z}_m(\vartheta_x,\varphi_y).$$

In the implementation, the correction map is defined by:

$$c(x,y)|_{q(x,y)>threshold} = \arg(\Delta z(x,y)) - \arg(\hat{z}(x,y)).$$

In the implementation, missing values may be obtained via one or more appropriate interpolation algorithms. Finally, the corrected image is computed by:

$$d(x,y) = \arg(\hat{z}(x,y)) - c(x,y).$$

Figure 7:
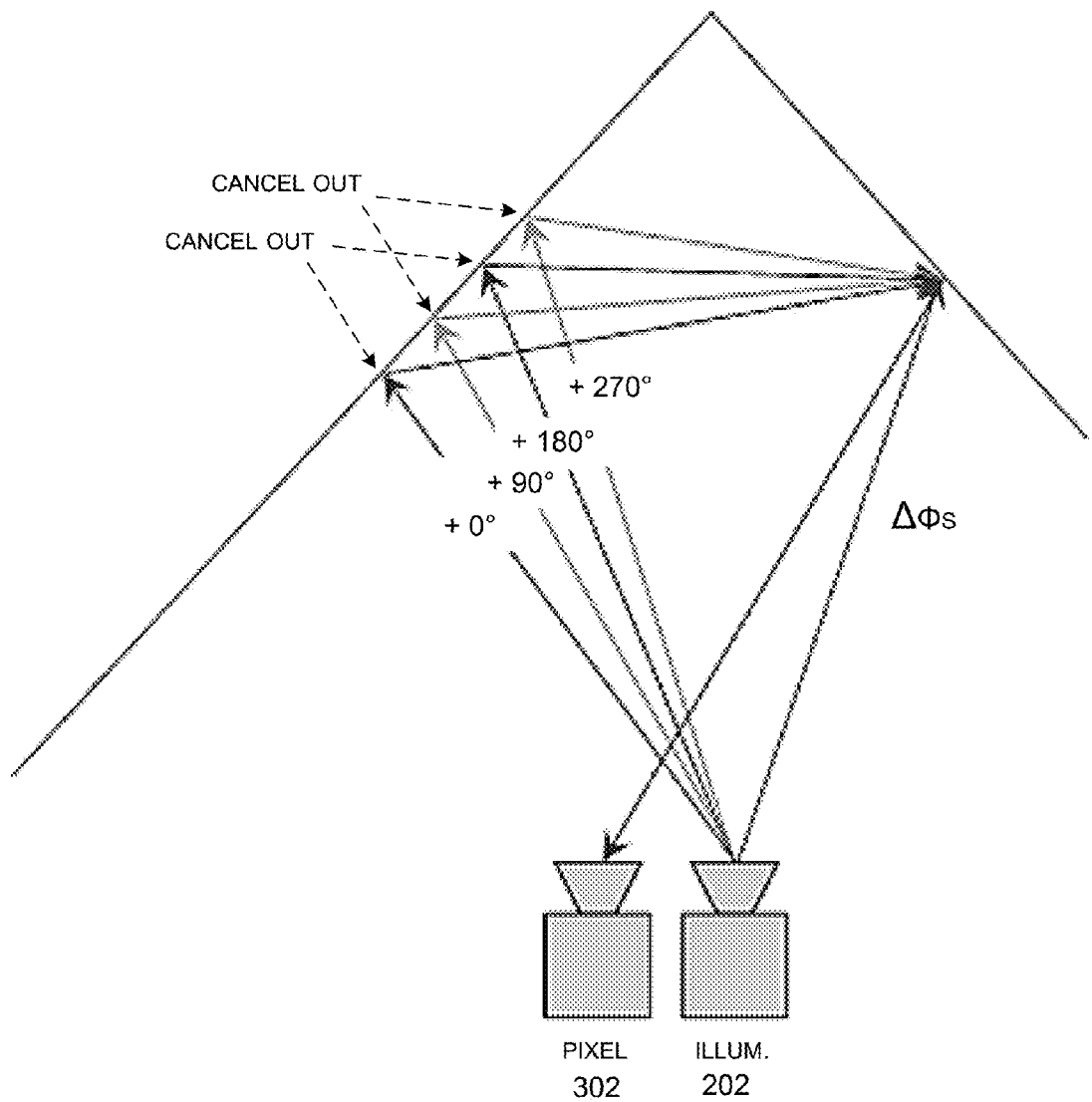
FIG. 7 illustrates an example of multipath cancellation, according to an implementation.
Figure 8:
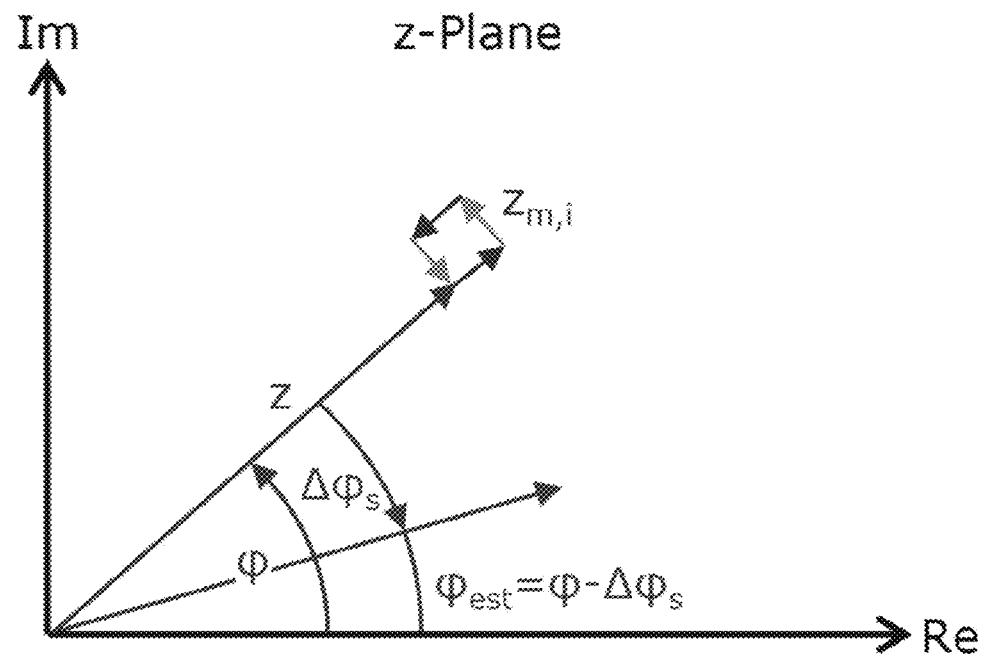
FIG. 8 illustrates an example of multipath cancellation with reference to a signal phasor and multipath phasors in the complex plane, according to an implementation.
Figure 8:
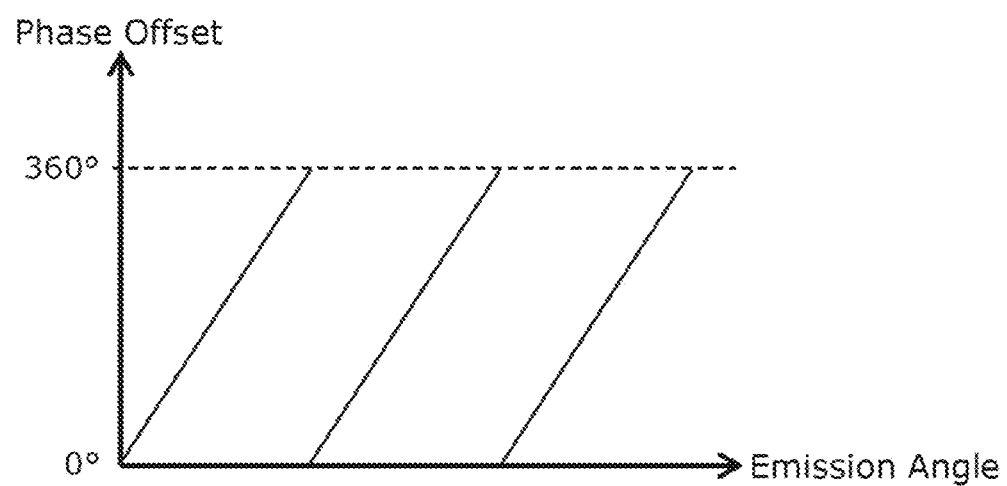

Alternately, or in addition to structuring the amplitude of the emitted light, based on the emission angle, in an implementation, the imaging system 102 incorporates a structure in the phase offset of the emitted light, depending on the emission angle. An illustration of phase offset structuring is given in FIGS. 7 and 8. In various implementations, as shown in FIG. 8, using phase offset structured light to cancel multipath interference operates similarly to amplitude structured light, discussed above. The linear offset pattern and the phase degrees shown in FIGS. 7 and 8 are an example; in general any phase structure with high spatial variation (e.g., at least a threshold amount of spatial variation) will work.

In an implementation, multipath interference may be cancelled within one frame using phase offset structured light. Further, pattern alternation is not necessarily needed to achieve the desired results. For example, due to the exploitation of destructive interference, multipath rays will ideally cancel out, or at least be diminished. In another implementation, application of structure in phase and amplitude may enhance performance (e.g., multipath interference cancellation) further.

In an implementation, since the signal ray (e.g., $z_s$) can also be subject to a phase offset ($\Delta\varphi_s$ in FIG. 8), this phase offset can be known and compensated for, for each pixel 302 and acquisition (e.g., image frame). In another implementation, the setup can be rigid, and the phase offset seen by a certain pixel 302 may not vary over time. In such an implementation, the pixel 302 can therefore be calibrated once in the production line. In any case, a ToF imager 102 is often offset-calibrated due to fixed-pattern-phase noise, so calibration and compensation do not cause any additional implementation effort.

In various implementations, additional or alternative components may be used to accomplish the disclosed techniques and arrangements.

Figure 9:
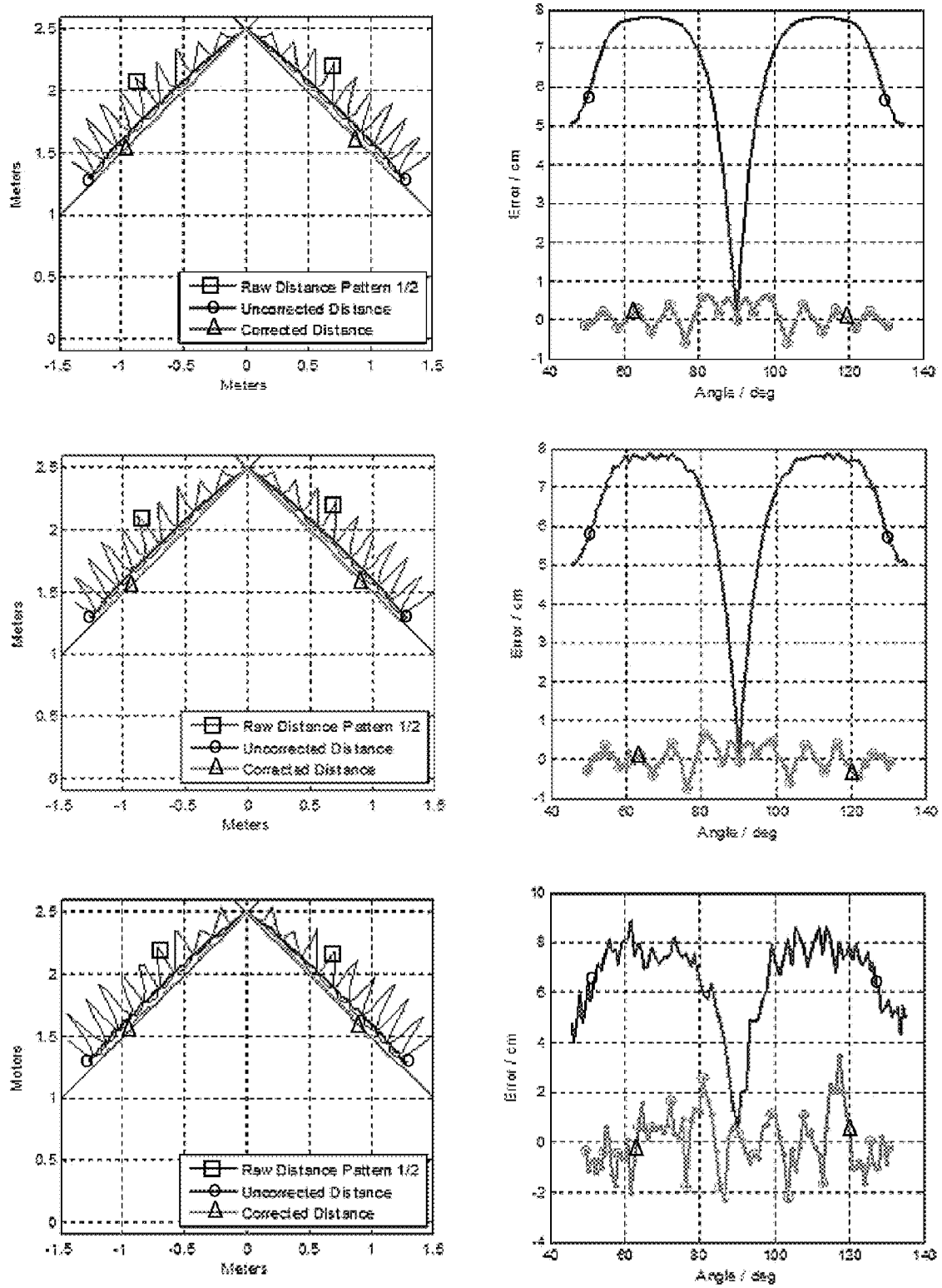
FIGS. 9 and 10 are graphical illustrations showing the effects of structured light solutions to multipath interference, according to various implementations.
Figure 10:
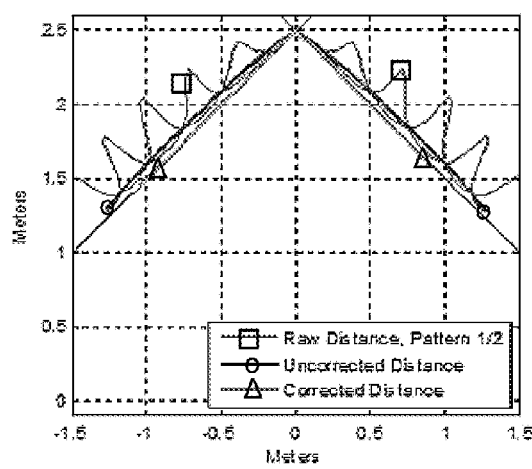
Figure 10:
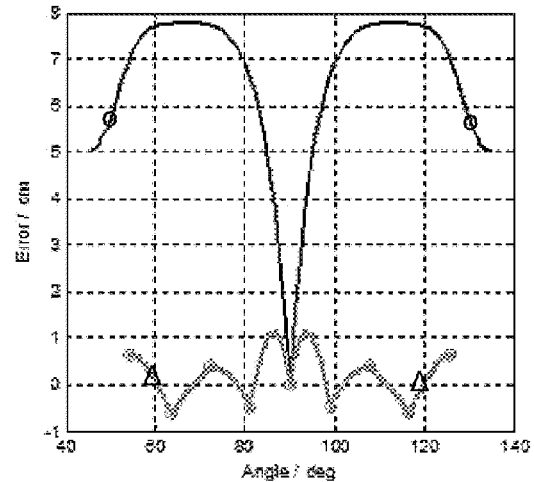
Figure 10:
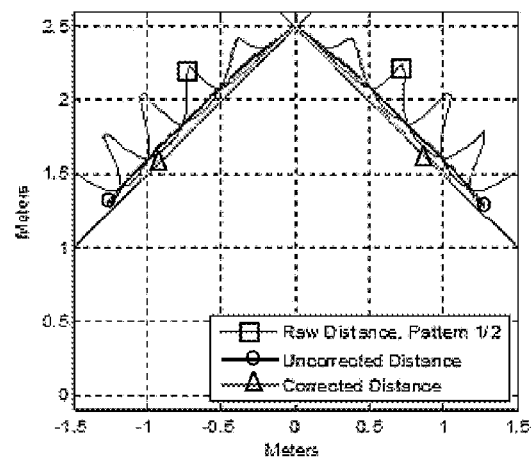
Figure 10:
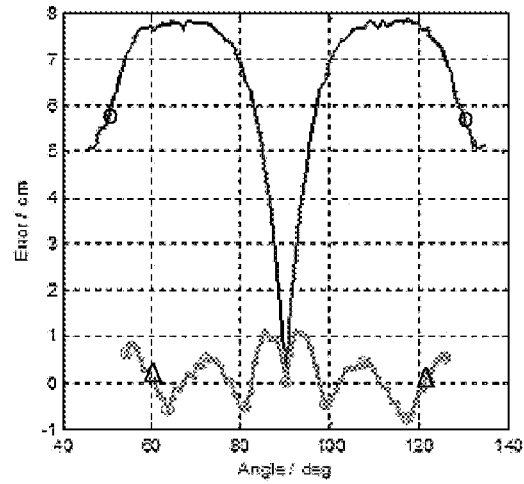
Figure 10:
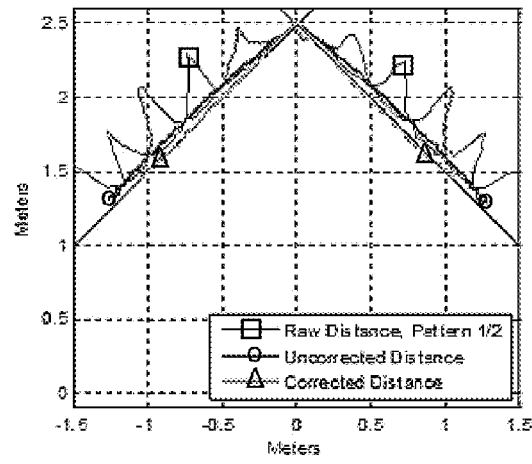
Figure 10:
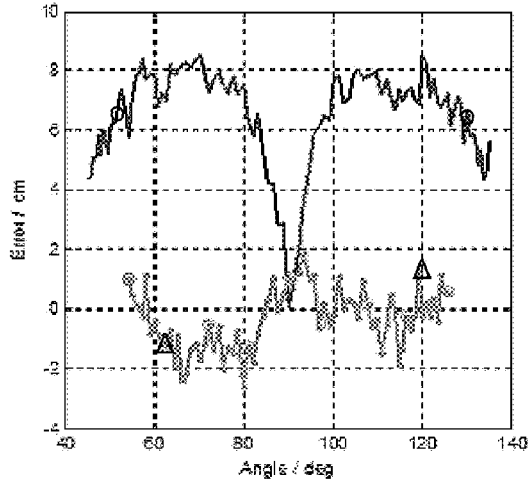

FIGS. 9 and 10 are graphical illustrations showing the effects of structured light solutions to multipath interference, according to various implementations. The graphical illustrations are the result of various simulations, as described below. A rudimentary, one-dimensional ray tracing engine was implemented in order to align closely with reality. Simulation was performed with the following parameters:

Scene: a typical wall/corner scenario. The camera (e.g., sensor module 206) and the light source (e.g., illumination module 202) are located at the origin.

Structured light pattern: complementary sinusoids, i.e.:

$$\text{Pattern 1: } w_0(\vartheta_x) = \left(1 + 0.9\,\cos\!\left(n\vartheta_x \frac{2\pi}{\gamma_{FOV}}\right)\right)\!/2$$

$$\text{Pattern 2: } w_1(\vartheta_x) = \left(1 - 0.9\,\cos\!\left(n\vartheta_x \frac{2\pi}{\gamma_{FOV}}\right)\right)\!/2$$

with $\gamma_{FOV}$ expressing the field of view (FOV) of the camera (e.g., sensor module 206) in radians. The factor n refers to the number of pattern repetitions over the FOV. Two values, 5 and 10, have been assessed. A cosine function was chosen instead of a step function to reflect non-idealities of real optics. FOV was chosen to be 90°.

Noise: in order to assess the robustness of the algorithm, a noise term was added to $z_0$ and $z_1$. Expressed in dB, SNRs of 160 dB (negligible noise), 78 dB (13-bit quantization) and 60 dB (10-bit quantization) were used, and are reflected in the result graphs of FIGS. 9 and 10.

Evaluation: simulation results are shown in FIGS. 9 and 10. The graphs of FIG. 9 represent n=10 pattern repetitions and the graphs of FIG. 10 represent n=5 pattern repetitions. On each of FIGS. 9 and 10, the top set of graphs represent SNR=160 dB, the center set of graphs represent SNR=78 dB, and the lower set of graphs represent SNR=60 dB. The correcting effects of the multipath cancellation are apparent in each of the graphs with the reduction in measurement error.

Representative Process

Figure 11:
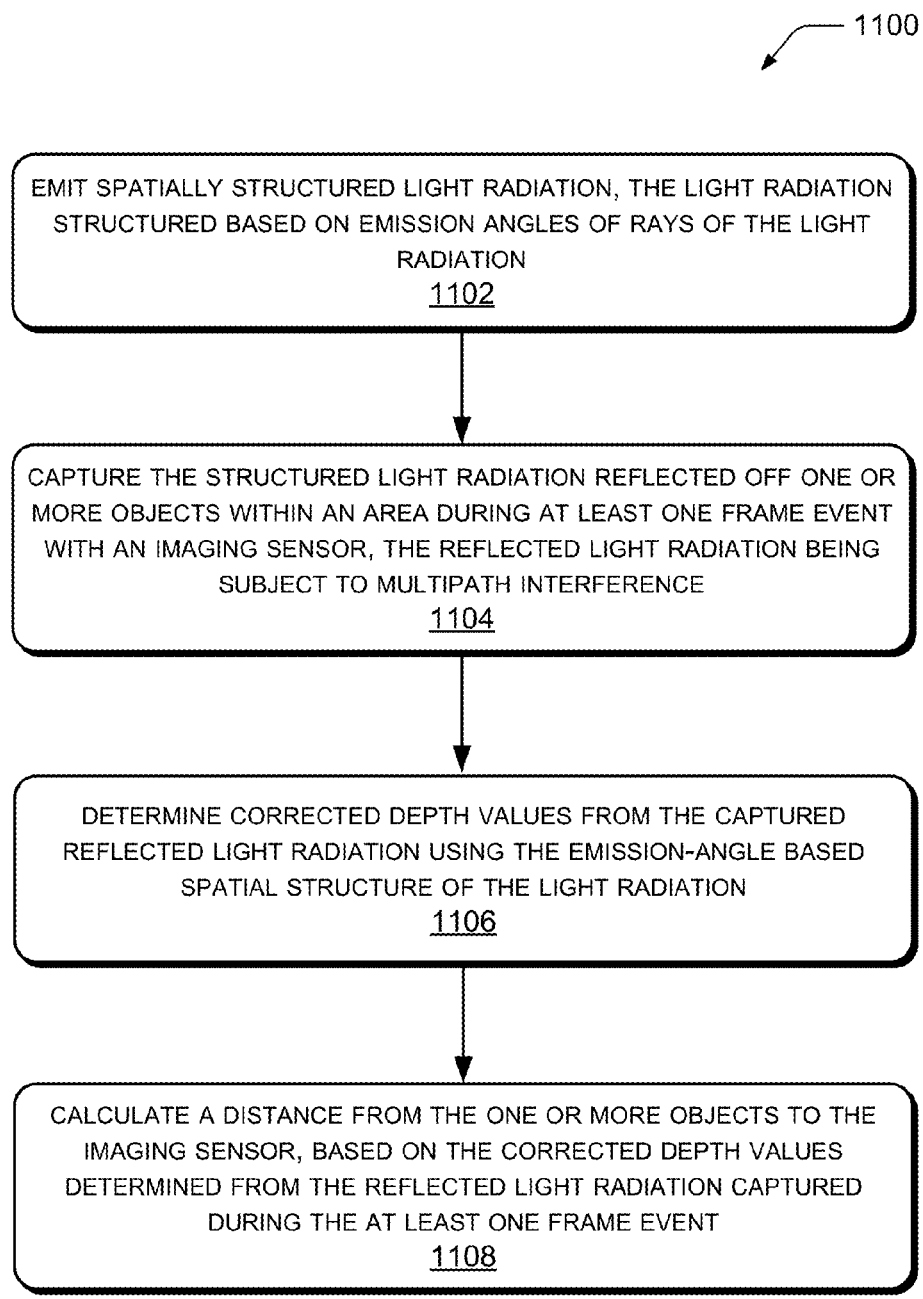
FIG. 11 is a flow diagram illustrating an example process of cancelling multipath interference by an imaging system, according to an implementation.

FIG. 11 illustrates a representative process 1100 for cancelling multipath interference at an imaging system (such as imaging system 102) and thus determining correct distances of objects (such as objects 106, for example) from the imaging system. The process 1100 describes emitting spatially structured light radiation, the structure being based on emission angles of rays of the light radiation, capturing the structured light radiation reflected from the scene, the reflected light being subject to multipath interference, and compensating for multipath interference and calculating corrected distance values. The process 1100 is described with reference to FIGS. 1-10.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

In one example, the light radiation may be emitted by an emitter (such as illumination module 202, or the like) comprising an LED or laser emitter, for example. In some implementations, the light radiation may be modulated light. For example, the light may be modulated using a modulation component (such as modulation component 204) and may be modulated in correlation to the modulation of one or more photosensitive pixels (such as pixels 302, for example) of the imaging device.

At block 1102, the process includes emitting spatially structured light radiation. In an implementation, the light radiation is structured based on emission angles of rays of the light radiation. In an implementation, the process includes structuring the emitted light radiation such that an amplitude of emitted light rays is dependent on an emission angle of the rays (e.g., structuring so that some light rays have a greater or lesser amplitude than other light rays, depending on the emission angle of the respective light rays). In another implementation, the process includes structuring the emitted light radiation such that a phase offset of emitted light rays is dependent on an emission angle of the rays (e.g., structuring so that some light rays have a greater or lesser phase offset than other light rays, depending on the emission angle of the respective light rays). In a further implementation, both amplitude and phase offset of the light rays are structured, based on emission angles of the respective light rays.

In various implementations, the light rays of the light radiation are structured using one or more patterns to provide the spatial structure. For instance, the pattern may provide weighting to the structure of the light rays, based on the emission angles of the light rays. In one example, a checkerboard pattern, or the like, may be used to structure the light rays.

At block 1104, the process includes capturing the structured light radiation reflected off one or more objects (such as object 106, for example) within an area (such as area 108, for example) during at least one frame event (i.e., an image capture at a point in time), with an imaging sensor (such as sensor module 206 and/or pixel 302, for example). The imaging sensor may be comprised of one or more photosensitive pixels (such as pixels 302), for example. The light reflection may be received by the imaging sensor via optics, a receiver, an antenna, or the like, for instance.

In an example, the reflected light radiation is subject to multipath interference. For instance, the reflected light may include one component representing correct distance information (i.e., correct depth values) and other components representing multipath interference. In such an instance, depth values based on the reflected light may be erroneous.

At block 1106, the process includes determining corrected depth values from the captured reflected light radiation taking advantage of the emission-angle based spatial structure of the light radiation. In one implementation, where the amplitudes of the light rays are structured based on the emission angle of the light rays, the process includes computing a correction map to determine the corrected depth values. For example, in one implementation, the correction map is based on the current frame event as well as the previous N−1 frames (one or more previous frame events where N is the number of weight patterns). For instance, in one example, the quantity of the one or more previous frame events is based on a quantity of weight patterns used to structure the light radiation.

In an implementation, the process includes applying the correction map to the captured (e.g., erroneous) depth values to determine the corrected depth values. In one implementation, first image information from a first frame event corresponding to a first spatially structured light pattern may be combined with second information from a second frame event corresponding to a second spatially structured light pattern to determine corrected depth values. In the implementation, the first spatially structured light pattern may be different from the second spatially structured light pattern. In one example, the second spatially structured light pattern is based on an inversion of the first spatially structured light pattern.

In another implementation, where the phase offsets of light rays are structured based on the emission angle of the rays, the process includes determining corrected depth values based on implicit cancellation of multipath interference from destructive interference due to the phase offset of the emitted light rays. In one example, the components of multipath interference are cancelled within one frame event, based on destructive interference cancellation, due to the phase offset of the emitted light rays.

In an implementation, the process also includes determining and applying a correction map that compensates for a distance offset based on the phase offset of the light radiation.

At block 1108, the process includes calculating a distance from the one or more objects to the imaging sensor, based on the corrected depth values determined from the reflected light radiation captured during the at least one frame event. For example, in an implementation, the process includes calculating a distance from the one or more objects to each pixel of the imaging sensor.

In an implementation, the process includes using an interpolation algorithm and a correction map to determine a correct image when reconstruction quality, including spatial transitions in applied weight patterns, do not meet a predefined threshold.

In an implementation, the process includes modelling the captured light radiation as one or more phasors in the complex plane, wherein an uncorrected distance measurement comprises a result phasor, the components of multipath interference comprise multipath interference phasors, and corrected distance information comprises a signal phasor comprising the result phasor less the multipath interference phasors.

In an implementation, the process further includes time-of-flight techniques such as measuring a time from emitting the light radiation to receiving the reflection of the light radiation and calculating a distance of an object based on the measured time. In various implementations, the process includes outputting image or gesture information to a computing device for input control, or the like. Additionally, the process may include outputting imaging information, such as a distance, a three-dimensional image of the detected object, tracking coordinates of the object, and so forth, to a display device, to another system arranged to process the information, or the like.

In alternate implementations, other techniques may be included in the process in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
    an imaging sensor arranged to capture light radiation reflected off one or more objects in an area during one or more frame events, the reflected light radiation being subject to multipath interference; and
    a processing component arranged to control a structure of the light radiation when emitted from a light source, at least one of an amplitude or a phase offset of light rays of the light radiation being structured according to emission angles of the light rays of the light radiation, the processing component arranged to determine corrected depth values from the reflected light radiation using an emission-angle based structure of the light radiation and to calculate a distance from the one or more objects to the imaging sensor, based on the corrected depth values.

2. The apparatus of claim 1, wherein the processing component is arranged to diminish or cancel one or more components of multipath interference of the light radiation captured during the one or more frame events, based on application of a spatially structured light radiation pattern to the light rays of the light radiation.

3. The apparatus of claim 2, wherein the processing component is arranged to apply a spatially structured amplitude pattern to the light rays of the light radiation, wherein an amplitude of a respective light ray, of the light rays, is determined according to an emission angle of the respective light ray.

4. The apparatus of claim 3, wherein the processing component is arranged to reconstruct distance information based on combining first information from a first frame event corresponding to a first spatially structured light pattern and second information from a second frame event corresponding to a second spatially structured light pattern, the first spatially structured light pattern being different from the second spatially structured light pattern.

5. The apparatus of claim 4, wherein the second spatially structured light pattern is based on an inversion of the first spatially structured light pattern.

6. The apparatus of claim 2, wherein the processing component is arranged to apply a structured phase offset to the light rays of the light radiation, wherein a phase offset of a respective light ray, of the light rays, is determined by an emission angle of the respective light ray.

7. The apparatus of claim 6, wherein the processing component is arranged to determine the corrected depth values based on cancellation of multipath interference from destructive interference due to the phase offset of the light rays.

8. The apparatus of claim 6, wherein the processing component is arranged to provide a compensation for depth values corresponding to light radiation captured by the imaging sensor, the compensation including a correction for a distance offset due to the phase offset applied to the light rays.

9. The apparatus of claim 1, wherein the processing component is arranged to control a structure of light emissions having a spatially structured light, based on one or more weight and/or offset patterns, wherein a weight and/or an offset of the one or more weight and/or offset patterns is dependent on the emission angles of the light rays of the light radiation.

10. The apparatus of claim 1, wherein the processing component is arranged to separate the reflected light radiation into amplitude and/or phase components of a fundamental wave of a sensor response function (SRF) output by a pixel of the imaging sensor.

11. The apparatus of claim 1, wherein the imaging sensor is arranged to capture a three-dimensional image of the area using time-of-flight principles during one or more frame events.

12. A system, comprising:
an illumination module arranged to emit spatially structured light radiation to illuminate an area, at least one of an amplitude or a phase offset of light rays of the spatially structured light radiation being structured based on emission angles of the light rays of the spatially structured light radiation;
a sensor module comprising a plurality of pixels arranged to capture the spatially structured light radiation reflected off one or more objects in the area during one or more frame events, the reflected spatially structured light radiation being subject to multipath interference; and
a control module arranged to determine corrected depth values from the reflected spatially structured light radiation using an emission-angle based spatial structure of the spatially structured light radiation, and to calculate a distance from the one or more objects to individual pixels of the plurality of pixels, based on the corrected depth values determined from the reflected spatially structured light radiation captured during at least one frame event of the one or more frame events.

13. The system of claim 12, the control module further arranged to control amplitudes and/or phase offsets of the light rays of the spatially structured light radiation emitted by the illumination module, a magnitude of the amplitudes and/or phase offsets of the light rays based on emission angles of the light rays of the spatially structured light radiation.

14. The system of claim 12, the control module further arranged to diminish or cancel one or more components of multipath interference of the reflected spatially structured light radiation captured during the one or more frame events, based on applying a spatially structured amplitude pattern and/or a spatially structured phase offset to the spatially structured light radiation emitted by the illumination module.

15. A method, comprising:
emitting spatially structured light radiation, at least one of an amplitude or a phase offset of rays of the spatially structured light radiation being structured based on emission angles of the rays of the spatially structured light radiation;
capturing the spatially structured light radiation reflected off one or more objects within an area during at least one frame event with an imaging sensor, the reflected spatially structured light radiation being subject to multipath interference;
determining corrected depth values from the reflected spatially structured light radiation taking advantage of an emission-angle based spatial structure of the spatially structured light radiation; and
calculating a distance from the one or more objects to the imaging sensor, based on the corrected depth values determined from the reflected spatially structured light radiation captured during the at least one frame event.

16. The method of claim 15, further comprising structuring the spatially structured light radiation such that an amplitude of the rays is dependent on an emission angle of the rays.

17. The method of claim 15, further comprising computing a correction map based on light rays captured during the at least one frame event and one or more previous frame events.

18. The method of claim 17, wherein a quantity of the one or more previous frame events is based on a quantity of weight patterns used to structure the spatially structured light radiation.

19. The method of claim 17, further comprising applying the correction map to captured erroneous depth values to determine the corrected depth values.

20. The method of claim 15, further comprising structuring the spatially structured light radiation such that the phase offset of the rays is dependent on the emission angles of the rays.

21. The method of claim 15, further comprising determining the corrected depth values based on cancellation of multipath interference from destructive interference due to the phase offset of the rays that are emitted.

22. The method of claim 15, wherein components of multipath interference are cancelled with one frame event, based on destructive interference cancellation, due to the phase offset of the rays that are emitted.

23. The method of claim 15, further comprising determining and applying a correction map that compensates for a distance offset based on the phase offset of the light radiation.

24. The method of claim 15, further comprising modelling the reflected spatially structured light radiation as one or more phasors in a complex plane, wherein an uncorrected distance measurement comprises a result phasor, components of multipath interference comprise multipath interference phasors, and corrected distance information comprises a signal phasor comprising the result phasor less the multipath interference phasors.

25. The method of claim 15, further comprising using an interpolation algorithm and a correction map to determine a correct image when reconstruction quality, including spatial transitions in applied weight patterns, do not meet a predefined threshold.

26. A three-dimensional imaging device, comprising:
an imaging sensor arranged to capture a three-dimensional image of an area based on time-of-flight principles, the imaging sensor comprising a plurality of pixels arranged to capture light radiation reflected off one or more objects in the area during one or more frame events, the reflected light radiation comprising distance information and multipath interference; and
a processing component arranged to control a structure of the light radiation when emitted from a light source, the processing component arranged to apply amplitude and/or phase offset structure to light rays of the light radiation according to emission angles of the light rays, the processing component arranged to determine corrected depth values from the captured reflected light radiation taking advantage of an emission-angle based structure of the light radiation and to calculate a distance from the one or more objects to the plurality of pixels of the imaging sensor, based on the corrected depth values.

* * * * *